US011114655B2

(12) United States Patent
Zimmerman et al.

(10) Patent No.: US 11,114,655 B2
(45) Date of Patent: Sep. 7, 2021

(54) ALKALINE BATTERY CATHODE WITH SOLID POLYMER ELECTROLYTE

(71) Applicant: Ionic Materials, Inc., Woburn, MA (US)

(72) Inventors: Michael A. Zimmerman, North Andover, MA (US); Alexei B. Gavrilov, Woburn, MA (US)

(73) Assignee: IONIC MATERIALS, INC., Woburn, MA (US)

( * ) Notice: Subject to any disclaimer, the term of this patent is extended or adjusted under 35 U.S.C. 154(b) by 0 days.

(21) Appl. No.: 15/879,846

(22) Filed: Jan. 25, 2018

(65) Prior Publication Data

US 2018/0212232 A1 Jul. 26, 2018
US 2020/0203715 A9 Jun. 25, 2020
US 2021/0226198 A9 Jul. 22, 2021

Related U.S. Application Data

(63) Continuation-in-part of application No. 15/723,630, filed on Oct. 3, 2017, now Pat. No. 10,741,877, and a continuation-in-part of application No. 15/672,878, filed on Aug. 9, 2017, now Pat. No. 10,811,688, and a continuation-in-part of application No. 15/605,425, filed on May 25, 2017, now Pat. No. 10,559,827, and a continuation-in-part of application No. 15/282,002, filed on Sep. 30, 2016, and a continuation-in-part of application No. 15/148,085, filed on May 6, 2016, and a continuation-in-part of application No. 14/676,173, filed on Apr. 1, 2015.

(60) Provisional application No. 62/450,715, filed on Jan. 26, 2017.

(51) Int. Cl.
| | |
|---|---|
| H01M 4/24 | (2006.01) |
| H01M 10/26 | (2006.01) |
| H01M 10/0565 | (2010.01) |
| H01M 4/131 | (2010.01) |
| H01M 4/50 | (2010.01) |
| H01M 10/6561 | (2014.01) |
| H01M 10/02 | (2006.01) |
| H01M 4/36 | (2006.01) |
| H01M 4/62 | (2006.01) |
| H01M 4/26 | (2006.01) |
| H01M 4/02 | (2006.01) |
| H01M 4/04 | (2006.01) |
| H01M 6/06 | (2006.01) |

(52) U.S. Cl.
CPC ............ *H01M 4/24* (2013.01); *H01M 4/131* (2013.01); *H01M 4/26* (2013.01); *H01M 4/366* (2013.01); *H01M 4/50* (2013.01); *H01M 4/502* (2013.01); *H01M 4/624* (2013.01); *H01M 10/02* (2013.01); *H01M 10/0565* (2013.01); *H01M 10/26* (2013.01); *H01M 10/6561* (2015.04); *H01M 4/0471* (2013.01); *H01M 4/625* (2013.01); *H01M 6/06* (2013.01); *H01M 2004/028* (2013.01); *H01M 2300/0082* (2013.01)

(58) Field of Classification Search
CPC ..... H01M 10/0565; H01M 2300/0082; H01M 4/622; H01M 6/181; H01M 4/50; H01M 4/625; H01M 4/602
See application file for complete search history.

(56) References Cited

U.S. PATENT DOCUMENTS

| | | | |
|---|---|---|---|
| 2,638,489 A | 5/1953 | Ruben | |
| 3,257,241 A | 6/1966 | Tamminen | |
| 3,336,279 A | 8/1967 | Scott | |
| 3,502,606 A | 3/1970 | Conciatori et al. | |
| 4,243,732 A | 1/1981 | Powers et al. | |
| 4,465,744 A | 8/1984 | Susman et al. | |
| 4,720,910 A | 1/1988 | Rourke et al. | |
| 4,804,594 A | 2/1989 | Jow et al. | |
| 4,925,751 A | 5/1990 | Shackle et al. | |
| 5,147,739 A | 9/1992 | Beard | |
| 5,160,880 A | 11/1992 | Palanisamy | |
| 5,169,494 A * | 12/1992 | Hashimoto | ............. G03F 7/039 430/18 |
| 5,227,043 A | 7/1993 | Shakushiro et al. | |
| 5,270,137 A | 12/1993 | Kubota | |
| 5,378,560 A | 1/1995 | Tomiyama | |
| 5,403,675 A | 4/1995 | Ogata et al. | |
| 5,424,151 A | 6/1995 | Koksbang et al. | |
| 5,462,566 A | 10/1995 | Skotheim | |
| 5,506,073 A | 4/1996 | Angell et al. | |
| 5,569,559 A | 10/1996 | Fauvarque | |
| 5,582,937 A | 12/1996 | LaFollette | |
| 5,599,355 A | 2/1997 | Nagasubramanian et al. | |
| 5,620,811 A | 4/1997 | Zhang et al. | |

(Continued)

FOREIGN PATENT DOCUMENTS

| | | |
|---|---|---|
| CN | 1285086 A | 2/2001 |
| CN | 1326596 A | 12/2001 |

(Continued)

OTHER PUBLICATIONS

Edman, L. et al., "Transport properties of the Solid Polymer . . . System," Journal of Physical Chemistry B, 2000; vol. 104, No. 15, pp. 3476-3480.

(Continued)

*Primary Examiner* — Imran Akram

(74) *Attorney, Agent, or Firm* — Burns & Levinson, LLP; Joseph M. Maraia

(57) ABSTRACT

An alkaline battery, and a component cathode including a solid ionically conducting polymer material.

21 Claims, No Drawings

(56) References Cited

U.S. PATENT DOCUMENTS

| | | |
|---|---|---|
| 5,648,187 A | 7/1997 | Skotheim |
| 5,660,953 A | 8/1997 | Bai et al. |
| 5,688,613 A | 11/1997 | Li et al. |
| 5,713,169 A | 2/1998 | Meier et al. |
| 5,882,621 A * | 3/1999 | Doddapaneni ........ C04B 35/524 423/445 R |
| 5,888,672 A | 3/1999 | Gustafson et al. |
| 5,917,693 A | 6/1999 | Kono et al. |
| 5,989,742 A | 11/1999 | Cabasso et al. |
| 6,074,773 A | 6/2000 | Wilkinson et al. |
| 6,110,619 A | 8/2000 | Zhang et al. |
| 6,162,563 A * | 12/2000 | Miura .................... C08G 65/22 429/309 |
| 6,183,914 B1 | 2/2001 | Yao et al. |
| 6,248,474 B1 | 6/2001 | Nishiyama et al. |
| 6,274,261 B1 | 8/2001 | Tinker et al. |
| 6,274,681 B1 | 8/2001 | Inagaki et al. |
| 6,358,651 B1 | 3/2002 | Chen et al. |
| 6,376,123 B1 | 4/2002 | Chu |
| 6,413,676 B1 | 7/2002 | Munshi |
| 6,451,487 B1 | 9/2002 | Besner et al. |
| 6,455,202 B1 | 9/2002 | Marugan et al. |
| 6,461,724 B1 | 10/2002 | Radovanovic et al. |
| 6,630,271 B1 | 10/2003 | Arcella et al. |
| 6,645,675 B1 | 11/2003 | Munshi |
| 6,652,440 B1 | 11/2003 | Kovalev et al. |
| 6,727,343 B2 | 4/2004 | Morris et al. |
| 7,070,882 B1 | 7/2006 | Ferrando |
| 7,455,935 B2 | 11/2008 | Abe et al. |
| 7,651,647 B1 | 1/2010 | Strange et al. |
| 8,227,105 B1 | 7/2012 | Gerald, II et al. |
| 8,753,594 B1 | 6/2014 | Burba, III et al. |
| 8,877,376 B2 | 11/2014 | Wakizaka et al. |
| 8,906,556 B2 | 12/2014 | Hambitzer |
| 8,945,432 B2 | 2/2015 | Towns et al. |
| 9,742,008 B2 | 8/2017 | Zimmerman et al. |
| 9,819,053 B1 | 11/2017 | Zimmerman |
| 10,553,901 B2 | 2/2020 | Zimmerman et al. |
| 2001/0003863 A1 | 6/2001 | Thibault et al. |
| 2002/0010261 A1 | 1/2002 | Callahan et al. |
| 2002/0048706 A1 | 4/2002 | Mayes et al. |
| 2002/0177043 A1 | 11/2002 | Ndzebet et al. |
| 2003/0013012 A1 | 1/2003 | Ahn et al. |
| 2003/0069343 A1 | 4/2003 | Smith et al. |
| 2003/0138702 A1 | 7/2003 | Gerald, II et al. |
| 2003/0162087 A1 | 8/2003 | Clarke et al. |
| 2003/0209692 A1 | 11/2003 | Farrand et al. |
| 2004/0023116 A1 * | 2/2004 | Fujino ............... H01M 10/0525 429/231.95 |
| 2004/0076881 A1 | 4/2004 | Bowden et al. |
| 2004/0157101 A1 | 8/2004 | Smedley |
| 2004/0229118 A1 | 11/2004 | Wensley et al. |
| 2004/0241553 A1 | 12/2004 | Abe et al. |
| 2005/0019661 A1 | 1/2005 | Han et al. |
| 2005/0112458 A1 * | 5/2005 | Dopp .................. H01M 50/183 429/174 |
| 2005/0112471 A1 | 5/2005 | Chen et al. |
| 2005/0164085 A1 | 7/2005 | Bofinger et al. |
| 2005/0181280 A1 | 8/2005 | Ceder et al. |
| 2005/0244696 A1 | 11/2005 | Kuromatsu et al. |
| 2005/0287441 A1 | 12/2005 | Passerini et al. |
| 2006/0004112 A1 | 1/2006 | Shimoyama et al. |
| 2006/0166085 A1 | 7/2006 | Hennige et al. |
| 2006/0269834 A1 | 11/2006 | West et al. |
| 2007/0015047 A1 | 1/2007 | Hosaka et al. |
| 2007/0020525 A1 | 1/2007 | Kim et al. |
| 2007/0051366 A1 | 3/2007 | Hansmann et al. |
| 2007/0166618 A1 | 7/2007 | Armand et al. |
| 2007/0250036 A1 | 10/2007 | Volk et al. |
| 2008/0066297 A1 | 3/2008 | Lin et al. |
| 2008/0090138 A1 | 4/2008 | Vu et al. |
| 2008/0118826 A1 | 5/2008 | Shimamura et al. |
| 2008/0199755 A1 | 8/2008 | Brotherston et al. |
| 2008/0248356 A1 | 10/2008 | Kimura et al. |
| 2008/0292953 A1 | 11/2008 | Hosaka et al. |
| 2008/0300380 A1 | 12/2008 | Bai et al. |
| 2009/0162755 A1 | 6/2009 | Neudecker |
| 2009/0197183 A1 | 8/2009 | Kato |
| 2009/0246636 A1 | 10/2009 | Chiang et al. |
| 2009/0272731 A1 | 11/2009 | Olding et al. |
| 2010/0227224 A1 | 9/2010 | Eitouni et al. |
| 2011/0020708 A1 | 1/2011 | Fujiki et al. |
| 2011/0027666 A1 | 2/2011 | Burchardt et al. |
| 2011/0070487 A1 | 3/2011 | Padhi et al. |
| 2011/0104511 A1 | 5/2011 | Okumura et al. |
| 2011/0104571 A1 | 5/2011 | Zhamu et al. |
| 2011/0111287 A1 | 5/2011 | Sayre et al. |
| 2011/0204341 A1 | 8/2011 | Brown et al. |
| 2011/0223477 A1 | 9/2011 | Nelson et al. |
| 2011/0223518 A1 | 9/2011 | Hirakimoto |
| 2011/0274983 A1 | 11/2011 | Yontz et al. |
| 2011/0274990 A1 | 11/2011 | Xu |
| 2011/0281158 A1 | 11/2011 | Tazoe |
| 2011/0281159 A1 | 11/2011 | Farmer et al. |
| 2011/0318646 A1 | 12/2011 | Babinec et al. |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |
| 2012/0171574 A1 | 7/2012 | Zhamu et al. |
| 2012/0189897 A1 * | 7/2012 | Wakizaka ............ H01M 50/411 429/144 |
| 2012/0208091 A1 | 8/2012 | Tsai et al. |
| 2012/0231355 A1 | 9/2012 | Lee et al. |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1 | 6/2013 | Hsieh et al. |
| 2013/0189589 A1 | 7/2013 | Hashaikeh et al. |
| 2013/0216936 A1 | 8/2013 | Fuchs et al. |
| 2014/0004431 A1 | 1/2014 | Yamaguchi et al. |
| 2014/0057153 A1 | 2/2014 | Visco et al. |
| 2014/0059820 A1 | 3/2014 | Wright et al. |
| 2014/0079995 A1 | 3/2014 | Wakada |
| 2014/0088207 A1 | 3/2014 | Elabd et al. |
| 2014/0141336 A1 | 5/2014 | Morin |
| 2014/0227614 A1 | 8/2014 | Lee et al. |
| 2014/0349160 A1 * | 11/2014 | Kato .................. H01M 8/1023 429/105 |
| 2014/0377621 A1 | 12/2014 | Hanyu et al. |
| 2015/0064574 A1 | 3/2015 | He et al. |
| 2015/0064575 A1 | 3/2015 | He et al. |
| 2015/0146452 A1 | 5/2015 | Kim et al. |
| 2015/0155559 A1 | 6/2015 | Zimmerman et al. |
| 2015/0180037 A1 | 6/2015 | Gronwald et al. |
| 2015/0280218 A1 | 10/2015 | Zimmerman et al. |
| 2015/0364791 A1 | 12/2015 | Vu et al. |
| 2016/0028133 A1 | 1/2016 | Miles |
| 2016/0118685 A1 | 4/2016 | Zhang et al. |
| 2016/0233461 A1 | 8/2016 | Young et al. |
| 2016/0233510 A1 | 8/2016 | Onodera et al. |
| 2016/0365553 A1 | 12/2016 | Kountz et al. |
| 2017/0005356 A1 | 1/2017 | Zimmerman |
| 2017/0018781 A1 | 1/2017 | Zimmerman |
| 2017/0092958 A1 | 3/2017 | Zimmerman et al. |
| 2017/0338492 A1 | 11/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0198124 A1 | 7/2018 | Zimmerman et al. |
| 2018/0219210 A1 | 8/2018 | Kim |
| 2018/0241031 A1 | 8/2018 | Pan et al. |
| 2019/0067764 A1 | 2/2019 | Zimmerman et al. |

FOREIGN PATENT DOCUMENTS

| | | |
|---|---|---|
| CN | 1326596 C | 12/2001 |
| CN | 1354529 C | 6/2002 |
| CN | 1457518 C | 11/2003 |
| CN | 1592937 A | 3/2005 |
| CN | 1965436 A | 5/2007 |
| CN | 101290985 A | 10/2008 |

(56) References Cited

FOREIGN PATENT DOCUMENTS

| | | |
|---|---|---|
| JP | 59-157151 | 9/1984 |
| JP | 59-157151 A | 9/1984 |
| JP | 04-267055 A | 9/1992 |
| JP | 9-219197 | 8/1997 |
| JP | 9-219197 A | 8/1997 |
| JP | 2002/352799 A | 12/2002 |
| JP | 2002-358959 A | 12/2002 |
| JP | 2003/242964 A | 8/2003 |
| JP | 2004-265675 A | 9/2004 |
| JP | 2005/535076 A | 11/2005 |
| JP | 2006/049122 A | 2/2006 |
| JP | 2006-210089 A | 8/2006 |
| JP | 2006-520519 A | 9/2006 |
| JP | 2007-080642 A1 | 3/2007 |
| JP | 2010/509719 A | 3/2010 |
| JP | 2011-28976 A | 2/2011 |
| JP | 2012-517519 | 8/2012 |
| JP | 2014-067638 A | 4/2014 |
| JP | 2014-112560 A | 6/2014 |
| KR | 10-2008-0023294 A | 3/2008 |
| KR | 10-2011-0106342 A | 9/2011 |
| KR | 10-2012-0117853 A | 10/2012 |
| WO | 1998/42037 A1 | 9/1998 |
| WO | 1999/33127 A1 | 7/1999 |
| WO | 2001/17051 A1 | 3/2001 |
| WO | 2001/026175 A1 | 4/2001 |
| WO | 2004/027909 | 4/2004 |
| WO | 2006/019064 A2 | 2/2006 |
| WO | 2011/146670 A1 | 11/2011 |
| WO | 2014/020349 A1 | 2/2014 |
| WO | 2015/084940 A1 | 6/2015 |
| WO | 2015/153729 A1 | 10/2015 |
| WO | 2019/065066 A1 | 4/2019 |

OTHER PUBLICATIONS

Florjancyz, K. et al., "Polymer-in-Salt Electrolytes . . . ," Journal of Physical Chemistry B, Jul. 15, 2004; vol. 108, pp. 14907-14914.
Kosters, J. et al., "Ion Transport Effects in a Solid Polymer . . . Ionic Liquid," Journal of Physical Chemistry, Jan. 30, 2013; vol. 117, pp. 2527-2534.
Lesch, V. et al., "A combined theoretical and experimental study of the Influence of Different anion . . . ionic liquids," Journal of Physical Chemistry B, 2014; vol. 118, No. 26, pp. 7367-7375.
Liew, C-W et al., "Characterization of ionic liquid added polyvinyl alcohol . . . supercapacitors," International Journal of Hydrogen Energy, Oct. 24, 2014; vol. 40, pp. 852-862.
Miyatake, K. et al., "Synthesis of poly(phylene sulfide sulfonic acid) via poly(sulfonium cation) as a thermostable proton-conducting polymer," Macromolecule, 1996; vol. 29, pp. 6969-6971.
Opi Online Courses, "Insulator, Semiconductor Conductor," (online), Jul. 1, 2012; 1 page.
Santosh, P. et al., "Preparation and properties of new cross-linked . . . lithium batteries," Journal of Power Sources, 2006; vol. 160, pp. 609-620.
Yang, Y. et al., "Effect of Lithium Iodide Addition . . . Solar Cell," Journal of Physical Chemistry, Mar. 20, 2008; vol. 112, No. 21, pp. 6594-6602.
Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of Temperature_TSP-07_Issue3.pdf>. entire document.
Candlin, J. "Polymers" within "The Chemical Industry: Second Edition." Edited by Alan Heaton. 1994. Spring Science+Business Media Dordrecht, pp. 116-121.
Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.
Definition of Dopant. http://www.merriam-webster.com/dictionary/dopant. Downloaded Feb. 4, 2019.
Definition of Nonflammable. http://www.dictionary.com/browse/nonflammable?s=t. As viewed on Jun. 7, 2016.
Ferrando, W.A., "Development of a Novel Composite Aluminum Anode," Journal of Power Sources, vol. 130, Issues 102, pp. 309-314, May 2004. Abstract only.
Lefrou, C. et al., "Electrochemistry: The Basics, With Examples." Springer-Verlag Berlin Heidelberg, pp. 22-25, 2012.
Polyphenylene Sulfide Information. DIC Corporation. http://www.dic-global.com/us/en/products/pps/about.html. Downloaded on Jun. 8, 2016.
Polystyrene, Wikipedia. https://en.wikipedia.org/wiki/Polystyrene. Downloaded Feb. 4, 2019.
Sandor, R.B., "PBI (Polybenzimidazole): Synthesis, Properties and Applications," High Performance Polymers, vol. 2, No. 1, pp. 25-37, 1990.
Sannigrahi, A. et al., "Tuning the Molecular Properties of Polybenzimidazole by Copolymerization," Journal of Physical Chemistry B, vol. 111, pp. 12124-12132, 2007.
Sigma Aldritch Materials Science Products. Pi-conjugated Polymers. Jun. 5, 2014 (Jun. 5, 2014) [retrieved on Aug. 9, 2016]. Retrieved from the Internet: <URL: http://www.sigmaaldrich.com/materials-science/material-science-products.html? TablePage=111775702>. entire document.
Solvay. Ryton PPS. Feb. 7, 2015 (Feb. 7, 2015) [retrieved on Aug. 9, 2016]. Retrieved from the Internet: <URL: http://www.solvay.com/en/markets-and-products/featured-products/Ryton-PPS.htmlf>, entire document.
Teng, H., "Overview of the development of the fluoropolymer Industry," Applied Sciences, 2012, vol. 2, pp. 496-512.
Tokito et al. Electrical Conductivity and Optical Properties of Poly(p-phenylene sulfide) doped with Some Organic Acceptors. Polymer Journal, vol. 17, No. 8, pp. 959-968.1985. Retrieved from the Internet<URL:HTTP://www.nature.com/pj/journal/v17/n8/pdf/pj 1985103a.pdf.> entire document.
Wikipedia entry of Electrolyte. https://en.wikipedia.org/wiki/Electrolyte. Downloaded Feb. 1, 2019.
Translated Text of the First Office Action, dated Aug. 7, 2018, from related Chinese Patent Application No. 2015/80018411.6.
Supplementary European Search Report, dated Apr. 5, 2017, from related European Patent Application No. 14868257, filed on Dec. 3, 2014.
Extended European Search Report, dated Oct. 8, 2018, from related European Patent Application No. 16804487.3, filed on Jan. 4, 2018.
Extended European Search Report, dated Oct. 5, 2018, from related European Patent Application No. 16804636.5, filed on Jan. 4, 2018.
Extended European Search Report, dated Dec. 13, 2018, from related European Patent Application No. 16808115.6, filed on Jun. 7, 2016.
Supplementary European Search Report, dated Oct. 15, 2018, from related European Patent Application No. 16808165.1, filed on Jun. 8, 2016.
Written Opinion of the Singapore Intellectual Property Office, dated Jul. 31, 2018, from related Singapore Patent Application No. SG2018/4525517527Y.
Ahmad et al., Structural studies and ionic conductivity of lithium iodide-lithium tungstate solid electrolytes. Ionics, 2002, 8, 433-438 (2002).
Celazole® T-Series: Injection Molding Thermoplastic Polymers. Brochure of PBI Performance Products, Inc., 2013.
Gal'Perin et al., Determination of the crystallinity of polyvinylidene fluoride. Polymer Science: USSR 1970, 12, 2133-2139 (1970).
Lee et al., PVDF-based nanocomposite solid polymer electrolytes; the effect of affinity between PVDF and filler on ionic conductivity. Composite Interfaces 2009, 16, 347-358.
Lithium Iodide Information. ChemBook. http://www.chemicalbook.com/ChemicalProductProperty_EN_cb8688141.htm. As viewed on Apr. 25, 2017.
PBI Information. Polymers: A Property Database 2017, CRC Press, Taylor & Francis Group (2017).
Polyacrylonitrile Information. ChemicalBook. http://www.chemicalbook.com/ChemicalProductProperty_USCB9199592.aspx. As viewed on Jan. 18, 2018.

(56) References Cited

OTHER PUBLICATIONS

Polymer Density Table. ScientificPolymer. http://scientificpolymer.com/density-of-polymers-by-density/. As viewed on Mar. 11, 2015.
Polyvinylidenefluoride (PVDF) Information, Goodfellow, http://www.goodfellow.com/E/Polyvinylidenefluoride.html. As viewed on Jan. 18, 2018.
Spry, R.J. et al., Anisotropic Ionic Conductivity of Lithium-Doped Sulfonated PBI, Journal of Polymer Science: Part B: Polymer Physics, 35, 2925-2933 (1997).
Suib, S.L., New and future developments in catalysis: Batteries, Hydrogen Storage and Fuel Cells. Elsevier B.V. Jul. 29, 2013, pp. 1-16.
Extended European Search Report, dated Oct. 9, 2018, from related European Application No. Ep 16804233, filed on Jan. 2, 2018.
International Search Report and the Written Opinion of the International Search Authority, dated Apr. 5, 2017, from related PCT/US2014/068338, filed on Dec. 3, 2014.
International Search Report and the Written Opinion of the International Search Authority, dated Oct. 26, 2016, from related PCT/US2016/035040, filed on May 31, 2016.
International Search Report and the Written Opinion of the International Searching Authority, dated Apr. 5, 2018 from related PCT/US2018/015146 filed on Jan. 25, 2018.
Fedelich, N., Application Handbook Thermal Analysis of Polymers Selected Applications Thermal Analysis. Retrieved from the Internet: https://www.mt.com/dam/LabDiv/guides-glen/ta-polymer/TA_Polymers_Selected_Apps_EN.pdf.
Imrie, C.T. et al., "Ion Transport in Glassy Polymer Electrolytes," Journal of Physical Chemistry B, vol. 103, pp. 4132-4138, 1999.
Lu, Y. et al., "Platinum-Gold Nanoparticles: A Highly Active Bifunctional Electrocatalyst for Rechargeable Lithium-Air Batteries," Journal of the American Chemical Society vol. 132, No. 35, pp. 12170-12171, 2010.
Taib, N. U. et al., "Plastic crystal-solid biopolymer electrolytes for rechargeable lithium batteries," Journal of Membrane Science, vol. 468, pp. 149-154, 2014.
Brady, D.G. "The crystallinity of poly(phenylene sulfide) and its effect on polymer properties." Journal of Applied Polymer Science, 1976, 20, 2541-2551.
Diez-Pascual, A.M. et al., "Inorganic nanoparticle-modified poly(phenylene sulphide)/carbon fiber laminates: thermomechanical behaviour." Materials, 2013, 6, 3171-3193.
Lefkowitz et al., "Influence of pH on the Reductive Transformation of Birnessite by Aqueous Mn(II)," Environmental Science & Technology, vol. 47, pp. 10364-10371, 2013.
Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.
Nohara, L.B. et al., "Study of crystallization behavior of poly(phenylene sulfide)." Polimeros: Ciencia e tecnologia, 2006, 16, 104-110.

Persson et al., "Materials Data on MnO2 (SG:164) by Materials Project," database entry #mp-25558, Nov. 2014 [retrieved via <https://doi.org/10.17188/1200755>].
Wang et al., "The effects of Mn loading on the structure and ozone decomposition activity of MnOx supported on activated carbon," Chinese Journal of Catalysis, vol. 35, No. 3, pp. 335-341, Mar. 13, 2014.
Yu et al., "Solution-combustion synthesis of epsilo-MnO2 for supercapacitors," Materials Letters, vol. 64, pp. 61-64, Oct. 9, 2009.
Zak, A.K. et al., "Synthesis and characterization of a narrow size distribution of zinc oxide nanoparticles." International Journal of Nanomedicine, 2011, vol. 6, No. 2, pp. 1399-1403.
International Search Report and Written Opinion, dated Oct. 2, 2019 for related PCT/US2019/038190, filed on Jun. 20, 2019.
Diez-Pascual, A., et al. "High-Performance Aminated Poly(phenylene sulfide)/ZnO Nanocomposites for Medical Applications." ACS Applied Materials & Interfaces 6, No. 13 (Jun. 13, 2014), 10132-10145.
Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with a copy of the translator signature is attached.
Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.
Wu, Y., ed., "Lithium Ion Battery Application and Practice," Chapter 11: Solid Electrolyte. Chinese; cited in Third Office Action for CN 2015/80018411.6. Art is summarized in the attached foreign Office Action citing the art, and a translation of the summary with a copy of the translator signature is attached.
Moharram, M.A. et al., "Electrical Conductivity of Poly(acrylic acid)—Polyacrylamide Complexes," Journal of Applied Polymer Science, John Wiley & Sons, Inc., vol. 68, pp. 2049-2055 (1998).
Wu, G. M. et al., "Alkaline Zn-air and Al-air cells based on novel solid PVA/PAA polymer electrolyte membranes," Journal of Membrane Science, Elsevier B.V., 280, pp. 802-808 (available online Apr. 4, 2006).
Zhang, Z. et al., "All-solid-state Al-air batteries with polymer alkaline gel electrolyte," Journal of Power Sources, Elsevier B.V., 251, pp. 470-475 (available online Nov. 20, 2013).
Hayashi, A. et al., "Superionic glass-ceramic electrolytes for room-temperature rechargeable sodium batteries," Nature Communications, 3:856, pp. 1-5 (May 22, 2012).
PCT/US2019/063562 International Search Report, dated Mar. 25, 2020.
Ye et al., Dictionary of Weapon Industry Science and Technology Exploder, edited by Ye Ying, National Defense Industry Press, published in Dec. 1991, p. 13-134.

\* cited by examiner

ALKALINE BATTERY CATHODE WITH SOLID POLYMER ELECTROLYTE

FIELD OF THE INVENTION

The present invention generally relates to an electrochemical battery having a solid ionically conductive polymer material, and more particularly to an alkaline battery and its component cathode.

BACKGROUND OF THE INVENTION

Typical primary zinc/manganese dioxide ("Zn/MnO$_2$") or alkaline batteries can provide good performance on variety of tests, including intermittent service tests, with low material and manufacturing costs. However, battery capacity and hence service life is limited by amount of electrochemically active ingredients such as MnO$_2$ and zinc which can be packed into the cell.

Therefore, the need for low cost and easy to manufacture alkaline batteries with improved run time in consumer applications is still unfulfilled, and there exists a need for a alkaline battery that can operate a variety of use applications.

SUMMARY OF THE INVENTION

According to an aspect, an electrochemical alkaline battery with or without an air electrode component which comprises a cathode including a solid ionically conducting polymer material.

In an aspect an alkaline battery comprising: a solid ionically conducting polymer material made by heating a mixture of a polymer and an ionic compound in air.

Further aspects of the alkaline battery are described as follows:

A battery comprising: an electrode that includes: an electrically conductive material, and a solid ionically conducting polymer material; wherein the polymer material is formed by heating a mixture of a polymer and an ionic compound in a gas selected from a group consisting of oxygen, air and ozone and combinations thereof or wherein the gas is independently oxygen, air or ozone.

The battery wherein the ionic conductivity of the solid ionically conducting polymer material is greater than $1\times10^{-6}$ S/cm at room temperature, preferably greater than $1\times10^{-5}$ S/cm at room temperature, and most preferably greater than $1\times10^{-4}$ S/cm at room temperature.

The battery, wherein the electrically conducting material comprises 3-30 percent by weight of the electrode.

The battery, wherein the solid ionically conducting polymer material comprises 1-30 percent by weight of the electrode.

The battery, wherein the electrode further comprises an electrochemically active material comprises 20-80 percent by weight of the electrode.

The battery, wherein the electrode further comprises an oxygen reduction catalyst.

The battery wherein the electrode further comprises manganese dioxide, and the manganese dioxide is selected from a group consisting of β-MnO2 (pyrolusite), ramsdellite, γ-MnO2, ε-MnO2, λ-MnO2, EMD, CMD, and combinations thereof.

The battery, wherein the battery is AA (LR6) sized.

The battery, wherein the electrode further comprises an electrochemically active material, and wherein the solid ionically conducting polymer material encapsulates at least one particle of the electrochemically active material.

The battery. wherein the battery has greater than 3 Ah capacity when tested on continuous constant current discharge at current between 150 and 300 mA with 0.8 V voltage cutoff.

The battery, wherein the positive electrode of the battery provides greater than 400 mAhr/g.

The battery, wherein the reactant polymer is polyphenylene sulfide.

The battery, wherein the reactant ionic compound is an inorganic hydroxide.

The battery, wherein the electrically conductive material comprises carbon.

The battery, wherein the ionic compound is lithium hydroxide.

A method of manufacturing an electrode comprising the steps of: Mixing a polymer with an ionic compound to create a first mixture; Heating the first mixture in air in a gas comprising oxygen to form the first mixture into a solid ionically conducting polymer material; Mixing the solid ionically conducting polymer material with an electrically conductive material to make an electrode which can ionically conduct hydroxide ions.

The method, wherein in the heating step the gas comprising oxygen is provided at a positive pressure.

The method, wherein in the making an electrode step the electrode further comprises a solid particulate electrochemically active material, and wherein both the solid ionically conducting polymer material and the electrically conductive material are coated onto the electrochemically active material.

DETAILED DESCRIPTION OF THE PREFERRED EMBODIMENTS

The present patent application claims priority from U.S. Provisional Patent Application No. 62/450,715, filed Jan. 26, 2017, and is a Continuation-In-Part of U.S. patent application Ser. No. 15/605,425, filed May 25, 2017, U.S. patent application Ser. No. 15/672,878 filed Aug. 9, 2017 and U.S. patent application Ser. No. 15/148,085, filed May 6, 2016 and U.S. patent application Ser. No. 15/282,002 filed Sep. 30, 2016, the disclosures of which are incorporated by reference herein in their entity.

An aspect includes a method of synthesizing a solid ionically conducting polymer material from at least three distinct components: a polymer, a dopant and an ionic compound. The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity).

Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesize the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conducting polymer material in a single step. However, this heating step can be done when in a separate step from any mixing or can completed while mixing is being done. The heating step can be performed regardless of the form of the mixture (e.g. film, particulate, etc.). In an aspect of the synthesis method, all three components are mixed and then extruded into a film. The film is heated to complete the synthesis.

When the solid ionically conducting polymer material is synthesized, a color change occurs which can be visually observed as the reactants color is a relatively light color, and the solid ionically conducting polymer material is a relatively dark or black color. It is believed that this color change occurs as charge transfer complexes are being formed, and can occur gradually or quickly depending on the synthesis method.

An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated. This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor (or gas phase) doping of film containing the base polymer and ionic compound and other doping methods known to those skilled in the art. Upon doping the solid polymer material becomes ionically conductive, and it is believed that the doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conducting polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%. Undoped conjugated polymers and polymers such as polyphenylene sulfide ("PPS") are also suitable polymer reactants.

Polymers are typically not electrically conductive. For example, virgin PPS has electrical conductivity of $10^{-20}$ S cm$^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Copolymers including monomers of the listed polymers and mixtures of these polymers may also be used. For example, copolymers of p-hydroxybenzoic acid can be appropriate liquid crystal polymer base polymers.

Table 2 details non-limiting examples of reactant polymers useful in the synthesis of the solid ionically conducting polymer material along with monomer repeat structure and some physical property information which should be considered also non-limiting as polymers can take multiple forms which can affect their physical properties.

TABLE 2

| Polymer | Monomer Structure | Pt. (C.) | Melting MW |
|---|---|---|---|
| PPS polyphenylene sulfide | (phenylene–S repeat unit) | 285 | 109 |
| PPO Poly(p-phenylene oxide) | (2,6-dimethyl phenylene–O repeat unit, CH$_3$ groups) | 262 | 92 |

TABLE 2-continued

| Polymer | Monomer Structure | Pt. (C.) | Melting MW |
|---|---|---|---|
| PEEK Polyether ether ketone | | 335 | 288 |
| PPA Polyphthalamide | | 312 | |
| Polypyrrole | | | |
| Polyaniline Poly-Phenylamine [C$_6$H$_4$NH]$_n$ | | 385 | 442 |
| Polysulfone | | | 240 |
| Xydar (LCP) | | | |
| Vectran Poly-paraphenylene terephthalamide [—CO—C$_6$H$_4$—CO—NH—C$_6$H$_4$—NH—]$_n$ | | | |
| Polyvinylidene fluoride (PVDF) | | 177° C. | |
| Polyacrylonitrile (PAN) | | 300° C. | |
| Polytetrafluoro-ethylene (PTFE) | | 327 | |
| Polyethylene (PE) | | 115-135 | |

Dopants that are useful as reactants in the synthesis of the solid ionically conducting polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone ($C_8Cl_2N_2O_2$) also known as "DDQ", and tetrachloro-1,4-benzoquinone ($C_6Cl_4O_2$), also known as chloranil, tetracyanoethylene ($C_6N_4$) also known as TCNE, sulfur trioxide ("$SO_3$"), ozone (trioxygen or $O_3$), oxygen ($O_2$, including air), transition metal oxides including manganese dioxide ("$MnO_2$"), or any suitable electron acceptor, etc. and combinations thereof.

In an aspect the dopant can be in the vapor state during synthesis, and under positive pressure. The positive pressure can result in increased ionic conductivity in the synthesized material, and for the dopant group comprising oxygen (i.e. oxygen, air, and ozone), the ionic conductivity can be increased to about or greater than $1 \times 10^{-4}$ S/cm.

The subclass of gas phase dopants oxygen, air and to a lesser extent ozone share an advantage of availability. In an aspect this dopant subclass can be used to reduce manufacturing process steps and associated expense.

Dopants that are temperature stable at the temperatures of the synthesis heating step are useful, and quinones and other dopants which are both temperature stable and strong oxidizers quinones are very useful. Table 3 provides a non-limiting listing of dopants, along with their chemical diagrams.

TABLE 3

| Dopant | Formula | Structure |
|---|---|---|
| 2,3-Dichloro-5,6-dicyano-1,4-benzoquinone (DDQ) | $C_6Cl_2(CN)_2O_2$ | |
| tetrachloro-1,4-benzoquinone (chloranil) | $C_6Cl_4O_2$ | |
| Tetracyanoethylene (TCNE) | $C_6N_4$ | |
| Sulfur Trioxide | $SO_3$ | |
| Ozone | $O_3$ | |
| Oxygen | $O_2$ | |
| Transition Metal Oxides | $M_xO_y$ (M = Transition Metal, x and y are equal to or greater than 1) | |

Ionic compounds that are useful as reactants in the synthesis of the solid ionically conducting polymer material are compounds that release desired ions during the synthesis of the solid ionically conducting polymer material. The ionic compound is distinct from the dopant in that both an ionic compound and a dopant are required. Non-limiting examples include $Li_2O$, LiOH, NaOH, KOH, $LiNO_3$, $Na_2O$, MgO, $CaCl_2$, $MgCl_2$, $AlCl_3$, LiTFSI (lithium bis-trifluoromethanesulfonimide), LiFSI (Lithium bis(fluorosulfonyl) imide), Lithium bis(oxalato)borate ($LiB(C_2O_4)_2$ "LiBOB") and other lithium salts and combinations thereof. Hydrated forms (e.g. monohydride) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be preferred. The particular ionic compound included in the synthesis depends on the utility desired for the material. For example, in an application where it would be desired to have a hydroxide anion, a lithium hydroxide or other inorganic hydroxide, or an oxide convertible to a hydroxide ion would be appropriate. As would be any hydroxide containing compound that releases a diffusing hydroxide anion during synthesis. A non-limiting group of such hydroxide ionic compounds includes metal. The hydroxide ionic compounds can include alkaline metals, alkaline earth metals, transition metals, and post transition metals in a form that can produce both the desired cationic and anionic diffusing species are appropriate as synthesis reactant ionic compounds.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are useful, and purities greater than 98% are more useful with even higher purities, e.g. LiOH: 99.6%, DDQ: >98%, and Chloranil: >99% also useful.

To further describe the utility of the solid ionically conducting polymer material and the versatility of the above described method of the synthesis of the solid ionically conducting polymer material, several classes of the solid ionically conducting polymer material useful for multiple electrochemical applications and distinguished by their application are described:

EXAMPLE 1

PPS polymer was mixed with the ionic compound LiOH monohydrate in the proportion of 67% to 33% (by wt.) in an aspect and 10-50 wt % in another aspect, respectively, and mixed using jet milling. The resulting mixture was then heat treated in the presence of air at a temperature between 250 and 350° C. for 30 minutes. Although positive pressure has been found to be useful for synthesis, heat was applied at atmospheric pressure in this example.

A sample of the synthesized solid ionically conducting polymer material (PPS/LiOH/$O_2$) was placed between stainless steel electrodes in a test fixture. AC impedance (EIS) was recorded in the range from 800 KHz to 100 Hz using Bio-Logic VSP test system to determine the electrolyte conductivity. Ionic conductivity exceeding $1 \times 10^{-5}$ S/cm was found.

The synthesized solid ionically conducting polymer material (PPS/LiOH/O$_2$) was then sieved to remove agglomerate particles and then mixed with an electrochemically active EMD, electrically conductive carbon and a small amount of potassium hydroxide and then mixed to form a cathode mixture. In an aspect, each particle of the active material, in this case EMD, is coated with the polymer/carbon mixture.

The cathode mixture can be modified to fit the desired application, and the composition ranges detailed in Table 4 describe the mix for cathode alkaline battery applications such as primary and secondary Zinc-MnO2, air-assisted Zinc-MnO2, and Zinc-Air batteries.

| Component | Wt % |
|---|---|
| Polymer electrolyte | 1-30 |
| EMD | 20-80 |
| KOH | 0-15 |
| Carbon | 3-30 |

Cells can be made using the cathode mixture described in Example 1 according to battery constructions described in US applications U.S. Ser. No. 14/559,430 and U.S. Ser. No. 15/169,160 the specifications of which are incorporated herein by reference.

In addition and specifically: AA air assist cells incorporating the cathode mixture demonstrated greater than 3 Ah capacity during: Continuous constant current discharge at current between 150 and 300 mA with 0.8 V voltage cutoff; Intermittent discharge at current between 150 and 300 mA cutoff applied for 1 hour, followed by 1-hour rest period (0.8V voltage cutoff); Continuous constant current discharge at 50 mA to 1.0V voltage cutoff; Intermittent discharge at 50 mA with applied for 1 hour, followed by 1-hour rest period (1.0V voltage cutoff); Continuous constant resistance discharge at 3.9 Ohm to 0.8V voltage cutoff; Intermittent constant resistance discharge when 3.9 Ohm resistance is applied for 1 hour, followed by 1-hour rest period (0.8V voltage cutoff); Continuous constant resistance discharge of at 42 Ohm to 1.0V voltage cutoff; and Intermittent constant resistance discharge when 42 Ohm resistance is applied for 15 seconds, followed by 45-second rest period (1.0V voltage cutoff). The AA air assist cells also demonstrated cathode capacities exceeding 400 mAh/g, 450 mAh/g, and 500 mAh/g.

Air Cathodes were prepared using the cathode mixture without any traditional catalyst and without EMD. The air cathodes thus prepared showed catalytic activity by reducing oxygen and electrochemical activity by producing useable voltage and amperage when coupled with a traditional zinc anode under load.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein. It is to be understood that variations and modifications can be made on the aforementioned structure without departing from the concepts of the describe aspects, and further it is to be understood that such concepts are intended to be covered by the following claims unless these claims by their language expressly state otherwise.

What is claimed is:

1. A battery comprising:
an electrode that includes:
an electrically conductive material; and
a solid ionically conducting polymer material;
wherein the solid ionically conducting polymer material has an ionic conductivity greater than $1\times10^{-6}$ S/cm at room temperature;
wherein the solid ionically conducting polymer material is the reaction product of a synthesis reaction of a mixture of a base polymer and an ionic compound heated in the presence of a gas;
wherein the gas is a dopant selected from the group consisting of oxygen, air and ozone, and functions as an electron acceptor or oxidant;
wherein the base polymer is polyphenylene sulfide; and
wherein the ionic compound is selected from the group consisting of an inorganic oxide, an inorganic chloride and an inorganic hydroxide.

2. The battery of claim 1, wherein the electrically conducting material comprises 3-30 percent by weight of the electrode.

3. The battery of claim 1, wherein the solid ionically conducting polymer material comprises 1-30 percent by weight of the electrode.

4. The battery of claim 1, wherein the electrode further comprises an electrochemically active material comprises 20-80 percent by weight of the electrode.

5. The battery of claim 1, wherein the electrode further comprises an oxygen reduction catalyst.

6. The battery of claim 1 wherein the electrode further comprises manganese dioxide, and the manganese dioxide is selected from a group consisting of β-MnO2 (pyrolusite), ramsdellite, γ-MnO2, ε-MnO2, λ-MnO2, EMD, CMD, and combinations thereof.

7. The battery of claim 1, wherein the battery is AA (LR6) sized.

8. The battery of claim 7, wherein the battery has greater than 3Ah capacity when tested on continuous constant current discharge at current between 150 and 300 mA with 0.8 V voltage cutoff.

9. The battery of claim 7, wherein the positive electrode of the battery provides greater than 400 mAhr/g.

10. The battery of claim 1, wherein the electrode further comprises an electrochemically active material, and wherein the solid ionically conducting polymer material encapsulates at least one particle of the electrochemically active material.

11. The battery of claim 1, wherein the electrically conductive material comprises carbon.

12. The battery of claim 1, wherein the ionic compound is lithium hydroxide.

13. The battery of claim 1, wherein the solid ionically conducting polymer material has an ionic conductivity greater than $1\times10^{-5}$ S/cm at room temperature.

14. The battery of claim 1, wherein solid ionically conducting polymer material has an ionic conductivity greater than $1\times10^{-4}$ S/cm at room temperature.

15. The battery of claim 1, wherein the base polymer and the ionic compound are mixed in the presence of the gas and heating is conducted during the mixing in a single step.

16. The battery of claim 1, wherein the base polymer and the ionic compound are mixed in the presence of the gas in a first step and heating is conducted in a second step.

17. The battery of claim 1, wherein the base polymer and the ionic compound are first mixed, the gas is introduced in a second step, and heating is applied to the mixture during the second step or subsequent to the second step.

18. The battery of claim 17, wherein the gas is added at positive pressure.

19. A method of manufacturing an electrode for a battery comprising the steps of:
- mixing a base polymer with an ionic compound to create a first mixture;
- heating the first mixture in a gas to form the first mixture into a solid ionically conducting polymer material;
- mixing the solid ionically conducting polymer material with an electrically conductive material to make an electrode which can ionically conduct hydroxide ions,
- wherein the solid ionically conducting polymer material has an ionic conductivity greater than $1 \times 10^{-6}$ S/cm at room temperature;
- wherein the gas is a dopant selected from the group consisting of oxygen, air and ozone, and functions as an electron acceptor or oxidant;
- wherein the base polymer is polyphenylene sulfide; and
- wherein the ionic compound is selected from the group consisting of an inorganic oxide, an inorganic chloride and an inorganic hydroxide.

20. The method of claim 19, wherein in the heating step the gas comprising oxygen is provided at a positive pressure.

21. The method of claim 19, wherein in the making an electrode step the electrode further comprises a solid particulate electrochemically active material, and wherein both the solid ionically conducting polymer material and the electrically conductive material are coated onto the electrochemically active material.

* * * * *